July 26, 1949.    F. PIERCE    2,477,527
HARMONIC COMPUTING MECHANISM
Filed April 8, 1946    3 Sheets-Sheet 1

Inventor
FIRTH PIERCE
By M. A. Hayes
Attorney

July 26, 1949.  F. PIERCE  2,477,527
HARMONIC COMPUTING MECHANISM
Filed April 8, 1946  3 Sheets-Sheet 2

Inventor
FIRTH PIERCE
By
M. A. Hayes
Attorney

July 26, 1949.　　　　　F. PIERCE　　　　　2,477,527
HARMONIC COMPUTING MECHANISM

Filed April 8, 1946　　　　　　　　　　　3 Sheets-Sheet 3

Inventor
FIRTH PIERCE

By M. O. Hayes
Attorney

Patented July 26, 1949

2,477,527

UNITED STATES PATENT OFFICE 2,477,527

HARMONIC COMPUTING MECHANISM

Firth Pierce, San Diego, Calif., assignor to the United States of America as represented by the Secretary of the Navy Application April 8, 1946, Serial No. 660,321

2 Claims. (Cl. 235—61)

The present invention is related to computing mechanisms of the ball type for generating harmonic functions.

In the Henrici harmonic analyzer a ball is supported between rollers. A drive roller or input roller located at one point, which may be called a pole for convenience of description, causes the ball to rotate about an axis which is parallel to the axis of the drive roller. A pair of output rollers engage the ball 90° apart at the equator and have their axes in the plane of the equator, and the speed of rotation imparted by the ball to each output roller depends on the number of degrees by which the axis of rotation of the ball fails to intersect the point of contact of the ball and that output roller. The input roller is mounted so that its axis of rotation may be swung around to swing also the axis of rotation of the ball and thereby change the speeds of the output rollers. For a constant speed of the drive roller the speeds of the output rollers are sine and cosine functions of the angular orientation of the axis of the drive roller.

Obviously other rollers in addition to those just described are required for holding the ball in place. One construction includes an idler roller at the pole opposite the drive roller. It is, of course, necessary with this construction to swing the axis of this idler roller with the axis of the drive roller. It has been found that extreme accuracy of alignment is difficult to maintain, but that extreme accuracy is necessary because any misalignment causes the two opposed rollers to act like a screw and crowd the ball to one side. This crowding gives rise to high frictional losses and so imposes excessive loads on the driving mechanism, and it frequently so reduces the pressure against one of the output rollers that the ball fails to drive that roller.

The use of a caster for this idler was proposed in the prior patent application of Dundred D. Evers (Serial No. 612,677, filed August 25, 1945), but the Evers construction required the idler roller to be placed away from the pole of the ball so that the force exerted on the ball by the driver and its opposed caster idler produced a resultant side force on the ball.

Accordingly, it is one object of the present invention to provide a caster construction for the roller of a ball computer such that the caster may engage the ball exactly at the pole.

It is a further object to provide a compact caster construction for a roller in a ball computer, and one which imposes little or no restraint on the rotation of the ball.

The Henrici harmonic analyzer is suitable only for resolving vector components and not for adding them. The aforementioned Evers' application discloses the use of caster output rollers to make such a ball type computer suitable for adding vectors. The Evers' construction places the castered output rollers slightly away from the poles of the ball and consequently so-called transient errors appear in the output velocity and in the angular position of the caster whenever the relative values of the input vectors is changing, that is when the orientation of the caster is changing.

It is an object of the present invention to provide a ball computer for adding vectors in which the output roller is located at the pole of the ball.

It is a further object to provide such a computer with a fast acting servo system for maintaining the output rollers in alignment with the axes of rotation of the ball.

A further object is the provision of an improved ball computer construction.

These and other objects and advantages of the present invention will appear from the following description of one specific embodiment thereof. In the drawing.

Figure 1:
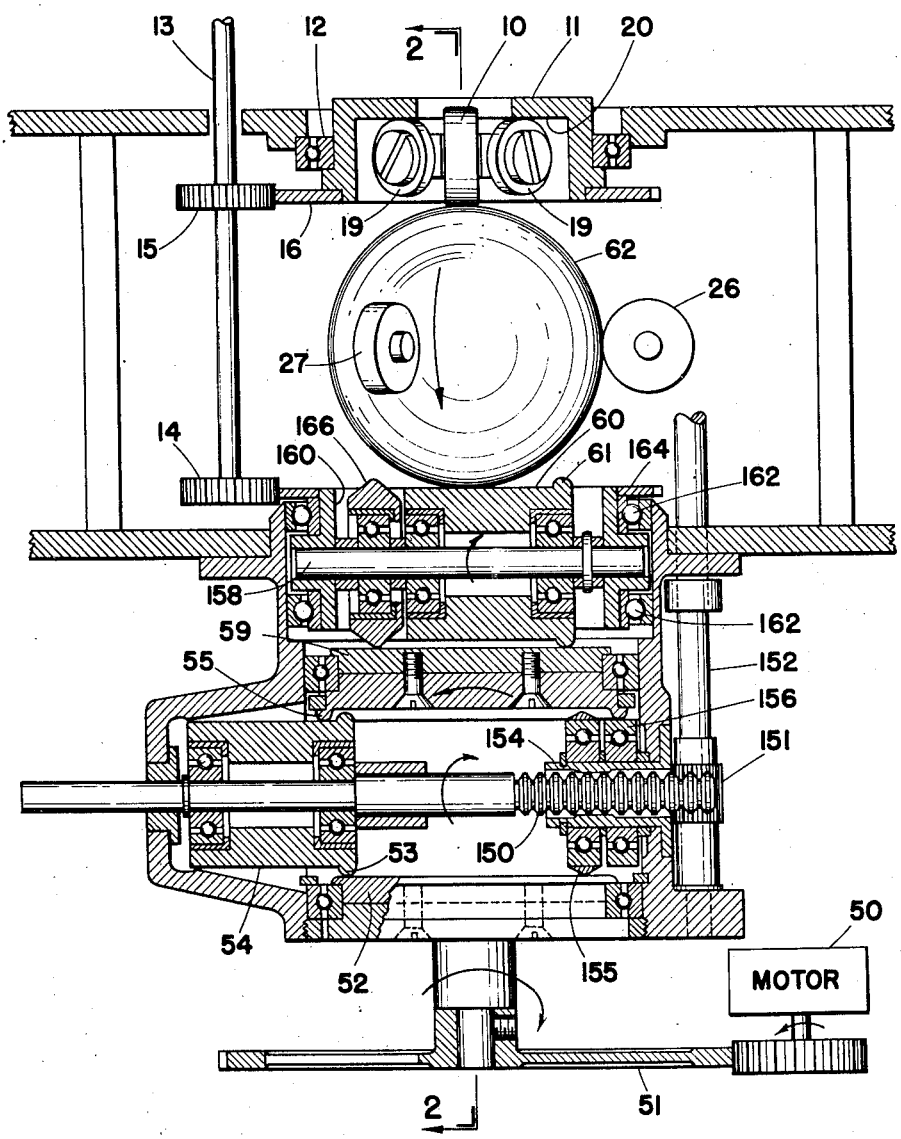
Fig. 1 is a sectional elevational view of a computer mechanism embodying the present invention.

As shown in Fig. 1, a constant speed motor 50, drives a gear 51 which in turn drives the disk 52. Disk 52 drives a roller 54 which has a ridge 53 which engages the driving surface of the disk 52 and has also a cylindrical surface which drives against a rim 55 on a second disk 59. The roller 54 is carried on reciprocatable shaft 150 which is equipped with circular grooves, or gear teeth that are engaged by a pinion 151 mounted on shaft 152 which constitutes a speed adjustment. The bushing 154 that supports shaft 150 also supports two ball bearing rollers 155 and 156 which respectively bear against the driving face of disk 52 and the rim 55 of the disk 56 to reduce the eccentric load imposed by the roller 54.

The roller 60 has a rim 61 which bears against disk 59 to be driven thereby, and the cylindrical portion of the roller 60 drives against the ball 62. The shaft 158 which supports the roller 60 is in turn supported in a ring 160 which turns in ball bearings 162.

Figure 2:
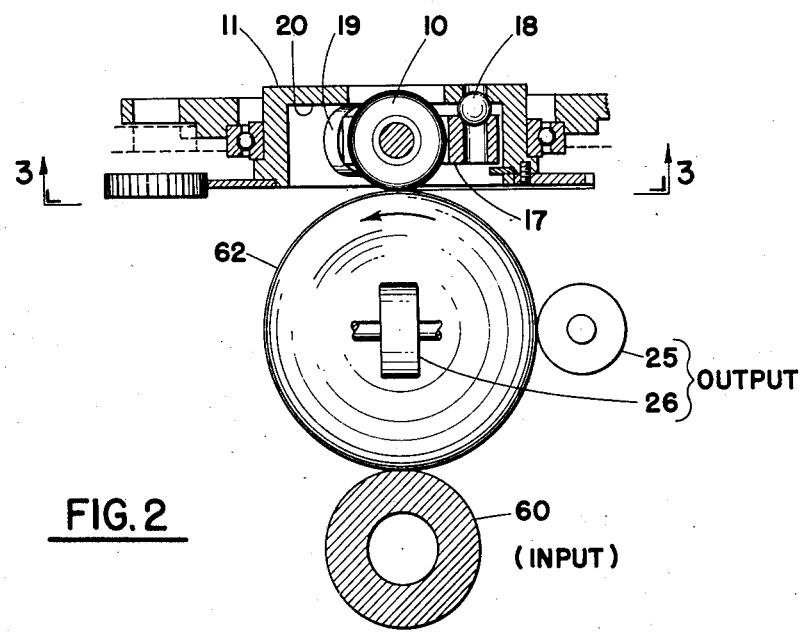
Fig. 2 is a partial section taken along the line 2—2 of Fig. 1 looking in the direction of the arrows.
Figure 3:
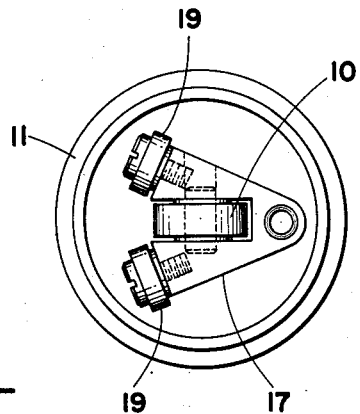
Fig. 3 is a partial view taken along the line 3—3 of Fig. 2 and looking in the direction of the arrows.

The rim 160 carries a gear 164 by which the drive roller may have its axis swung around to any orientation. Opposite the roller 60 is an idler roller 10 supported in a cup or frame 11 which in turn is supported in ball bearing 12. A control shaft 13 carries a gear 14 which drives gear 164 and carries also a gear 15 which drives a gear 16 on the cup 11. This shaft 13 and its two gears 14 and 15 rotate ring 160 and cup 11 together so that the roller 60 and 10 may be kept with their axes substantially parallel. However, because of backlash in the gears and other difficulties, the alignment in general cannot be made as precise as is desired by means of these gears alone. As is shown in Figs. 2 and 3 roller 10 is supported in a V shaped arm or yoke 17 which pivots on a small ball 18 to let roller 10 trail casterlike on the surface of the ball 62. A pair of small rollers 19 whose axes radiate from the vertical axis through ball 18 roll against the face 20 of the cup 11. These two rollers 19 together with the ball 18 support the force which the ball 62 exerts against the roller 10. The mechanism includes also a pair of output rollers 25 and 26 and an idler 27.

It should be observed that roller 60 turns in only one direction about its shaft 158 and consequently the ball 62 can rotate in only one direction relative to the supports of the caster roller 10. Since the cup 11 is kept in alignment with the cup 160, it is possible for the caster 10 to always be kept in a trailing attitude, that is trailing behind the pivot ball 18. The sides of the cup 11 permit a large enough angle of swing of the yoke 17 and castor roller 10 to allow for any errors that can arise in the misalignment of cups 11 and 160.

It is to be noticed that in this construction the idler roller 10 may be placed exactly opposite the roller 60 so that the forces exerted against the ball by the two rollers 60 and 10 produce no resultant force directed sideways that would tend to crowd the ball out of position. When any misalignment does appear between rollers 60 and 10, the roller 60, being fixed in position, will force the ball to conform to its position, and roller 10, since it is free to caster, will trail along. Since roller 10 is incapable under these conditions of exerting any sideways force, it is impossible for the two rollers to crowd the ball sideways.

In this construction, the caster is brought approximately to its correct orientation by the same control 13 that makes the change in orientation necessary. Consequently only a slight realignment (of perhaps one degree) needs be effected by the caster action and this small motion is the only aligning action that demands a driving effort from the ball. Furthermore, since only a few degrees of caster swing are required, it is possible to provide a caster that is both compact and easy to operate.

Figure 4:
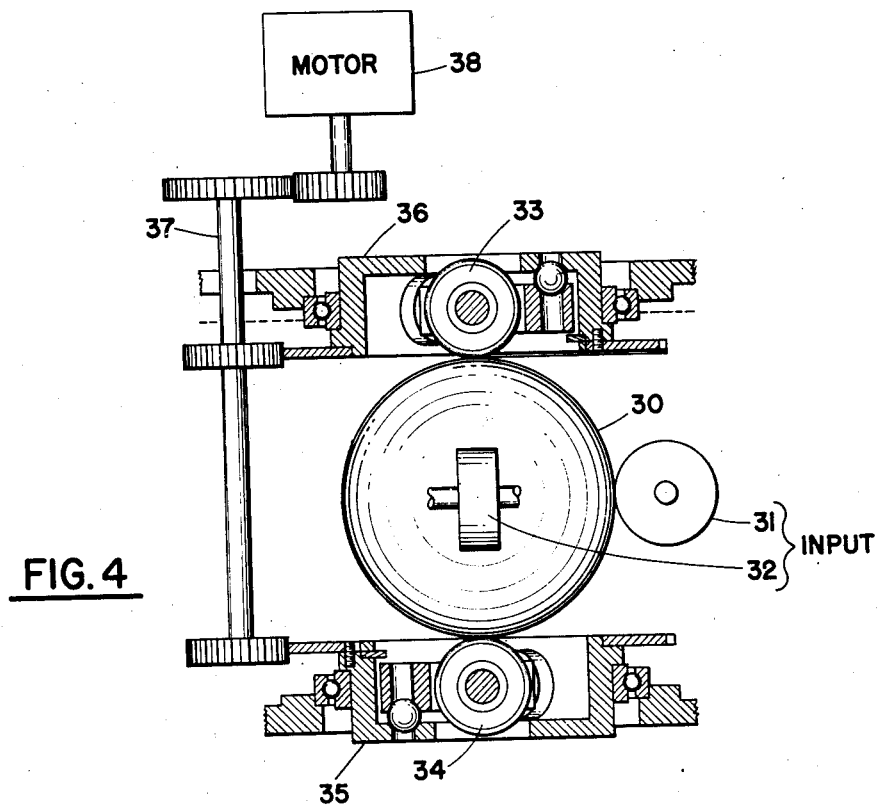
Fig. 4 is a sectional elevation of a mechanism for adding vector components, embodying my invention.
Figure 5:
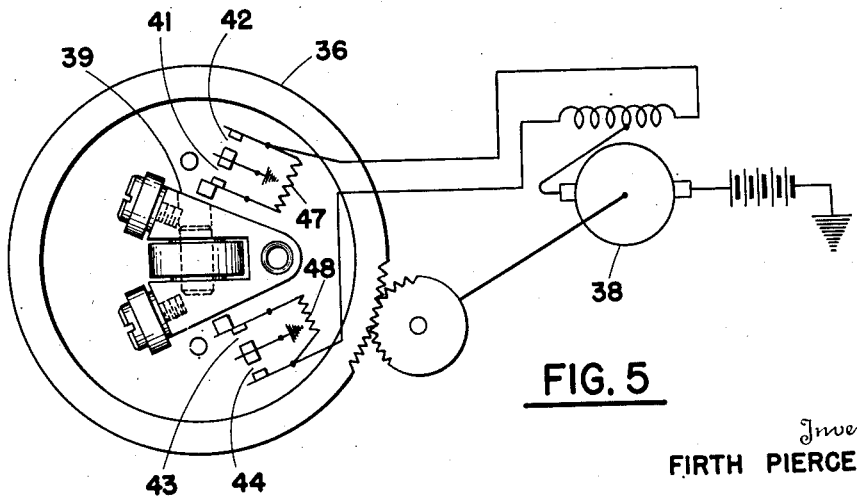
Fig. 5 is a partially schematic view of a part of the device of Fig. 4.

Figs. 4 and 5 show a system for adding vectors. A ball 30 is driven by two input rollers 31 and 32, located 90° apart at the equator of the ball, and the ball in turn drives a castered output roller 33 located at one pole. A castered idler 34 at the other pole, and another idler roller at the equator (not shown) hold the ball in position. Rollers 33 and 34 are castered in rotatable cups 35 and 36 which are rotated together by means of a shaft 37 and servo motor 38. Roller 34 and its cup 35 are identical with roller 10 and cup 11 of Figs. 1, 2 and 3. Roller 33 differs only in the addition of electric contacts for controlling motor 38.

It can be seen that when input rollers 31 and 32 are driven they will rotate the ball 30 about by some definite axis. If the output roller 33 is not aligned with that axis, then the trailing action of the caster will cause it to swing. This castor action is taken advantage of to control motor 38 and thereby align both rollers 33 and 34 with the axis of the ball 30. As shown in Fig. 5, the supporting cup 36 of the caster 33 carries electric contacts 41, 42, 43 and 44. As the caster arm or yoke 39 swings upward as seen in Fig. 5 it first closes contacts 41 to energize the electric motor 38 through resistor 47 for slowly rotating the cup 36 (and also the cup 35). This rotation of the cup is in the direction to move the contact 40 away from the caster arm 39 and so tend to open those contacts. Additional upward motion of the arm 39 in Fig. 5 closes contact 42 to speed up the motor 38. Similarly contacts 43 and 44 and resistor 48 on the opposite side of the caster arm cause the motor 38 to operate in the opposite direction. Consequently, whenever output roller 33 does not lie in direct alignment with the rotation of the ball 30 as determined by input rollers 31 and 32 the servo motor 38 is immediately energized to swing roller 33 (and therefore also roller 34) around into correct orientation.

Preferably, contacts 41 and 43 are adjusted to allow only a slight motion of arm 39 from the opening of one to the closing of the other. Resistors 47 and 48 make the response to small changes slow and make it safe to have a close adjustment of contacts 41 and 43. Preferably contacts 42 and 44 cause a rapid rotation of cup 36.

It is preferable that the normal forces (or so called pressure) exerted by the driven rollers 33 and 34 against the ball 30 be materially less than those exerted by the driving rollers 31 and 32. This condition obviously can be attained in the present construction because the two groups of normal forces are perpendicular to each other. This adjustment ensures that the ball will always rotate in response to the driving rollers 31 and 32 regardless of temporary misalignment of the driven rollers 33 and 34 (as when the relative speeds of input rollers 31 and 32 are changing) and so make certain that there will always be a ball motion for castered roller 33 to respond to for controlling the servo motor 38.

It will be apparent that the present invention is capable of numerous modifications and variations. Accordingly, I do not intend to be limited to any specific construction or modification except as required by the scope of the claims.

I claim:

1. In combination in a device of the class described a ball, a frame rotatable about an axis approximately through the center of said ball and having a plane surface normal to said axis, a rigid caster arm pivoted about a point removed from the axis about which said frame rotates, a wheel rotatably supported in said caster arm adapted to engage said ball substantially on said axis, and a pair of rollers supported for rotation on said arm about angularly spaced axis directed radially from said caster pivot and adapted to bear against the said plane surface of said frame as said arm pivots about said caster axis.

2. In combination in a computing device of the class described, a ball, a first and second roller each engaging said ball at substantially diametrically opposed points, at least a third roller engaging said ball, means for supporting the first roller and for rotating its axis with respect to said third roller, means for pivotally supporting the second roller at a point displaced from the axis of rotation thereof whereby said roller may swing caster-like to trail on the surface of the ball, means for limiting the angle of caster of said second roller within its supporting means, and means for rotating said supporting means of said second roller approximately in step with the rotation of the axis of the first roller to thereby keep the axis of the second roller approximately in the same plane as the axis of said first roller so that the caster action of said second roller will cause it to trail and seek correct alignment with said first roller, contact means positioned adjacent said second roller whereby to be operated by the caster-like swinging of said second roller about its pivotal connection with said support, and means electrically controlled by said contacts for driving said rotating means of said first roller and said support of said second roller.

FIRTH PIERCE.

REFERENCES CITED

The following references are of record in the file of this patent:

UNITED STATES PATENTS

| Number | Name | Date |
| --- | --- | --- |
| 1,256,234 | Innes | Feb. 12, 1918 |
| 1,701,582 | Mengden | Feb. 12, 1929 |
| 1,757,597 | Smith | May 6, 1930 |
| 1,963,457 | Avery | June 19, 1934 |
| 2,139,635 | House | Dec. 6, 1938 |
| 2,139,636 | House | Dec. 6, 1938 |
| 2,412,468 | Newell | Dec. 10, 1946 |

FOREIGN PATENTS

| Number | Country | Date |
| --- | --- | --- |
| 188,527 | Great Britain | Nov. 16, 1922 |
| 777,913 | France | Dec. 15, 1934 |